United States Patent [19]

Goel

[11] Patent Number: 4,721,767
[45] Date of Patent: Jan. 26, 1988

[54] PROCESS FOR COPOLYMERIZATION OF BICYCLIC AMIDE ACETALS AND POLYISOCYANATES

[75] Inventor: Anil B. Goel, Worthington, Ohio
[73] Assignee: Ashland Oil, Inc., Ashland, Ky.
[21] Appl. No.: 4,738
[22] Filed: Jan. 20, 1987
[51] Int. Cl.$^4$ .............................................. C08G 18/30
[52] U.S. Cl. ...................................... 528/55; 528/56; 528/57; 528/73
[58] Field of Search ....................... 528/55, 56, 57, 73

[56] References Cited

U.S. PATENT DOCUMENTS 4,016,113 4/1977 Preston et al. ...................... 521/110
4,438,248 3/1984 Christman et al. ................... 528/55
4,562,240 12/1985 Goel et al. .......................... 548/218

Primary Examiner—Maurice J. Welsh
Assistant Examiner—S. A. Acquah
Attorney, Agent, or Firm—John F. Jones

[57] ABSTRACT

An improved process for the copolymerization of a mixture of a bicyclic amide acetal and a polyisocyanate comprising carrying out the copolymerization reaction at a temperature in the range of from about ambient temperature up to about 200° C. in the presence of a catalytic amount of a salt of a metal selected from the group consisting of bismuth, lead, mercury, copper, vanadium, cobalt, nickel, potassium, zinc and antimony is described.

20 Claims, No Drawings

PROCESS FOR COPOLYMERIZATION OF BICYCLIC AMIDE ACETALS AND POLYISOCYANATES

This invention relates to an improved process for the copolymerization of mixtures of bicyclic amide acetals and polyisocyanates and more particularly pertains to an improved process for enhancing the rate of polymerization of mixtures of bicyclic amide acetals and polyisocyanates by the inclusion of catalytic amounts of salts of certain metals including bismuth, lead, mercury, copper, vanadium, cobalt, nickel, potassium, zinc and antimony in said mixtures.

Reactions of bicyclic amide acetals with polyisocyanates at high temperatures to give solid but brittle polymers have been described in West German Pat. No. 3,235,933. The improvement of copolymerization rates and improvement in the physical properties of the resulting polymers by use of organotin and tertiary amine catalysts is described in commonly assigned U.S. Patent Application Ser. No. 777,904, filed 9/18/85.

The catalytic copolymerization of bicyclic amide acetals and polyisocyanates produces polymeric products which are useful in applications such as reaction injection molding (RIM), in structural adhesives, coatings and the like.

I have discovered an improved process for the production of polymers having improved physical properties at higher rates by carrying out the copolymerization of bicyclic amide acetals and polyisocyanates at a temperature in the range of from about ambient to about 200° C. in the presence of a catalytic amount of the salts of metals including bismuth, lead, zinc, copper, vanadium, antimony, potassium, nickel, cobalt and mercury. Although any salt of the metal including halides, alkoxides, hydroxides, carboxylates, nitrates and the like can be used, the carboxylate salts which result from the reaction of a carboxylic acid with the metal and organo metals are preferred. Some of these salts are given in "Polyurethanes Chemistry and Technology, Part I", by Saunders and Frisch which disclosure is incorporated herein by reference.

Bicyclic amide acetals useful in the process of this invention include those having one of the Formulas I, II, or III:

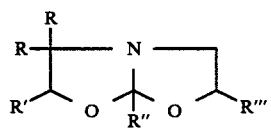

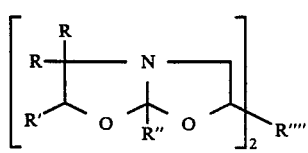

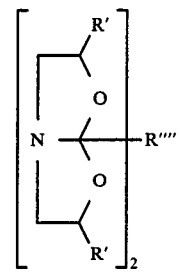

wherein R, R' and R''' independently represent hydrogen, an alkyl group having from 1 to 20 carbon atoms, an aryl group having from 6 to 12 carbon atoms, an alkyl ether group having from 1 to 20 carbon atoms or an aryl ether group having from 7 to 20 carbon atoms; R'' represents hydrogen, an alkyl group having from 1 to 20 carbon atoms, or an alkaryl group having from 7 to 20 carbon atoms and R'''' represents an alkylene group having from 1 to 20 carbon atoms, an alkarylene group having from 7 to 20 carbon atoms, an alkylene ether group having from 1 to 20 carbon atoms or an arylene ether group having from 6 to 20 carbon atoms.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene 1,3-diisocyanate, 1,4-diisocyanato cyclohexane, cyclopentene-1,3-diisocyanate, p-phenylene diisocyanate, 1-methyl phenylene-1,4-diisocyanate, naphthalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

The use of small amounts of the catalyst (0.001 to about 5% by weight of catalyst based on the weight of the combined bicyclic amide acetal and polyisocyanate) results in improvements such as significant polymerization rate increase, lower reaction temperatures required, and much higher (improved) polymer physical properties. For instance, the reaction of a bicyclic amide acetal of Formula I wherein R, R' and R''' represent hydrogen and R'' represents methyl with liquid methylene bis(phenyl isocyanate) at room temperature requires more than 30 minutes to gel and the polymer obtained, even after post curing at 100° C. for 20 minutes has been found to be extremely brittle so that no physical testing could be carried out on the polymer. In comparison, when the foregoing reaction is carried out in the presence of about 0.03% by weight of bismuth octoate, the gelation occurred in less than one minute and the polymer obtained had a notched izod impact strength of 0.5 foot pounds per inch of notch and a heat distortion temperature of about 152° C. Similarly, other salts of metals within the scope of this invention improve the rate of copolymerization of bicyclic amide acetals with polyisocyanates.

The use of other additives which are well known to react with isocyanates, such as polyols, polyamines, polyepoxides, and the like as well as the use of plasticizers, fillers, pigments and the like in the process is within the scope of this invention.

This invention is further illustrated in the following representative examples.

EXAMPLES 1–19

Several experiments were carried out by mixing a variety of bicyclic amide acetals with polyisocyanates in the absence as well as in the presence of a variety of metal salts as catalysts. The reactions were carried out in a 20 ml jar. The catalyst was dissolved in the bicyclic amide acetal and the solution was mixed with the polyisocyanate. The progress of the polymerization reaction was determined by recording the rise in the reaction temperature with time by using a thermocouple. The gel time was determined to be the time required to give the maximum exotherm in the reaction mixture Usually at this point, the reaction mixture reached a semi-solid form. The reactions in which little or no exotherm was noticed were run for a maximum of 30 minutes. The results are summarized in the following Table. Example 1 is given for comparison purposes and is outside the scope of the present invention.

TABLE

| EXAMPLE NO | BICYCLIC AMIDE ACETAL (g) | POLY-ISO-CYANATE (g) | CATALYST (g) | GEL TIME (MINUTES) |
| --- | --- | --- | --- | --- |
| 1 | A (3.3) | MDI (7.5) | — | 30 |
| 2 | A (3.3) | MDI (7.5) | Bi (0.015) | 0.2 |
| 3 | A (3) | MDI (6.6) | Bi (0.005) | 0.6 |
| 4 | A (6) | MDI (13.2) | Bi (0.005) | 1.2 |
| 5 | A (3) | MDI (6.6) | V (0.002) | 1.7 |
| 6 | A (3) | MDI (6.6) | (0.005) | 1.3 |
| 7 | A (3) | MDI (6.6) | Zn (0.004) | 1.2 |
| 8 | A (3) | MDI (6.6) | Zn—H (0.001) | 2 |
| 9 | A (3) | MDI (6.6) | Co (0.004) | 1.2 |
| 10 | A (3) | MDI (6.6) | Pb (0.002) | 1.8 |
| 11 | A (3) | MDI (6.6) | Pb (0.005) | 0.7 |
| 12 | A (3) | MDI (6.6) | Hg (0.005) | 1.4 |
| 13 | A (3) | MDI (6.6) | Cn (0.005) | 1 |
| 14 | A (3) | MDI (7) | K (0.13) | 4.6 |
| 15 | A (3) | MDI (6.8) | Ni (0.006) | 1.5 |
| 16 | B (3) | MDI (6) | Bi (0.05) | 0.3 |
| 17 | C (3) | MDI (2.9) | Bi (0.17) | 1 |
| 18 | A (3.3) | IPDI (5.6) | Bi (0.02) | 1.5 |
| 19 | A (3.3) | HMDI (7.5) | Bi (0.05) | 1.2 |

A = Bicyclic Amide Acetal of Formula I wherein R, R' and R''' are Hydrogen and R'' is Methyl.
B = Bicyclic Amide Acetal of Formula I wherein R, R' and R''' are Hydrogen and R'' is Ethyl.
C = Bicyclic Amide Acetal of Formula I wherein R is Methyl, R' is Hydrogen, R'' is $C_7H_{15}$ and R''' is $CH_2OCH = CH_2$.
MDI = Liquid Methylene Bis(phenyl isocyanate) (NCO Functionality of 2.1 NCO Groups per Molecule).
IPDI — Isophorone Diisocyanate.
HMDI = Hydrogenated MDI
Bi = Bismuth Octoate
V = Vanadium Octoate
Zn = Zinc Octoate
Zn—H = Zinc 2-ethyl Hexanoate
Co = Cobalt Octoate
Pb = Lead Octoate
Hg = Phenyl Mercuric Propionate
Cu = Copper Naphthoate
K = Potassium Octoate
Ni = Nickel Octoate

EXAMPLE 20

This experiment carried out in the absence of any catalyst is a comparative example and is outside the scope of the present invention. Methyl substituted bicyclic amide acetal of Formula I wherein R, R' and R''' are hydrogen and R'' is methyl, 32.5 g, was degassed on a rotary evaporator under reduced pressure and was mixed with 78 g of degassed liquid methylene bis(phenyl isocyanate). The resulting mixture was poured into a mold prepared from two parallel silicone mold release agent coated glass plates held apart by ⅛ inch thick spacers. The mold was placed in an oven at 100° C. for 20 minutes. The resulting mixture polymer sheet was found to be extremely brittle and no physical testing could be done on it.

EXAMPLE 21

The procedure of Example 20 was followed using the same reaction charge except that a catalyst was included. The bicyclic amide acetal (32.5 g) was mixed with 0.03 g of bismuth octoate catalyst and the degassed mixture was mixed rapidly with 78 g of the diisocyanate and the resulting mixture was poured into the mold. The polymerization occurred within two minutes to give a solid sheet. The sheet was postcured at 100° C. for 20 minutes. The resulting sheet was found to have a notched izod impact strength of 0.5 foot pounds per inch of notch (ASTM D-256), a heat distortion temperature (ASTM D-648) of 151° C., a flexural strength (ASTM D-790) of 20,685 psi and a flexural modulus of 440,750 psi.

I claim:

1. The process for the copolymerization of a mixture of a bicyclic amide acetal and a polyisocyanate comprising carrying out the copolymerization at a temperature in the range of from about ambient temperature up to about 200° C. in the presence of a catalytic amount of a salt of a metal selected from the group consisting of bismuth, lead, mercury, copper, vanadium, cobalt, nickel, potassium, zinc and antimony.

2. The process of claim 1 wherein the bicyclic amide acetal is one of Formula I, II or III:

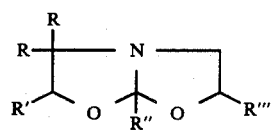

I

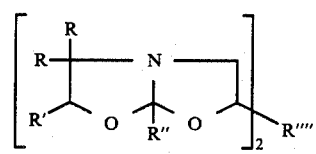

II

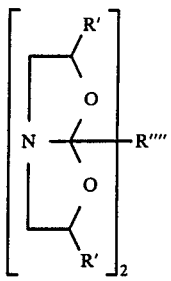

wherein R, R' and R''' independently represent hydrogen, an alkyl group having from 1 to 20 carbon atoms, an aryl group having from 6 to 12 carbon atoms, an alkyl ether group having from 7 to 20 carbon atoms; R'' represents hydrogen, an alkyl group having from 1 to 20 carbon atoms, or an alkaryl group having from 7 to 20 carbon atoms and R'''' represents an alkylene group having from 1 to 20 carbon atoms, an alkarylene group having from 7 to 20 carbon atoms, an alkylene ether group having from 1 to 20 carbon atoms or arylene ether group having from 6 to 20 carbon atoms.

3. The process of claim 2 wherein the salt of the metal is present in from 0.001 to about 5% by weight based on the weight of the combined weight of the bicyclic amide acetal and polyisocyanate.

4. The process of claim 3 wherein the bicyclic amide acetal is one of Formula I wherein R, R' and R''' represent hydrogen and R'' represents a methyl group.

5. The process of claim 3 wherein the bicyclic amide acetal is one of Formula I wherein R, R' and R''' represent hydrogen and R'' represents an ethyl group.

6. The process of claim 3 wherein the bicyclic amide acetal is one of Formula I wherein R represents a methyl group, R' represents hydrogen, R'' represents $C_7H_{15}$ and R''' represents $CH_2OCH=CH_2$.

7. The process of claim 4 wherein the polyisocyanate is liquid methylene bis(phenyl isocyanate) and the salt of the metal is bismuth octoate.

8. The process of claim 4 wherein the polyisocyanate is liquid methylene bis(phenyl isocyanate) and the salt of the metal is vanadium octoate.

9. The process of claim 4 wherein the polyisocyanate is liquid methylene bis(phenyl isocyanate) and the salt of the metal is zinc octoate.

10. The process of claim 4 wherein the polyisocyanate is liquid methylene bis(phenyl isocyanate) and the salt of the metal is zinc 2-ethyl hexanoate.

11. The process of claim 4 wherein the polyisocyanate is liquid methylene bis(phenyl isocyanate) and the salt of the metal is cobalt octoate.

12. The process of claim 4 wherein the polyisocyanate is liquid methylene bis(phenyl isocyanate) and the salt of the metal is lead octoate.

13. The process of claim 4 wherein the polyisocyanate is liquid methylene bis(phenyl isocyanate) and the salt of the metal is phenyl mercuric propionate.

14. The process of claim 4 wherein the polyisocyanate is liquid methylene bis(phenyl isocyanate) and the salt of the metal is copper naphthoate.

15. The process of claim 4 wherein the polyisocyanate is liquid methylene bis(phenyl isocyanate) and the salt of the metal is potassium octoate.

16. The process of claim 4 wherein the polyisocyanate is liquid methylene bis(phenyl isocyanate) and the salt of the metal is nickel octoate.

17. The process of claim 4 wherein the polyisocyanate is isophorone diisocyanate.

18. The process of claim 5 wherein the polyisocyanate is liquid methylene bis(phenyl isocyanate) and the salt of the metal is bismuth octoate.

19. The process of claim 6 wherein the polyisocyanate is methylene bis(phenyl isocyanate) and the salt of the metal is bismuth octoate.

20. The process of claim 4 wherein the polyisocyanate is hydrogenated methylene bis(phenyl isocyanate) and the salt of the metal is bismuth octoate.

* * * * *